Oct. 17, 1933.    L. T. ROSS    1,930,862
SNOWPLOW
Filed March 2, 1931    3 Sheets-Sheet 3
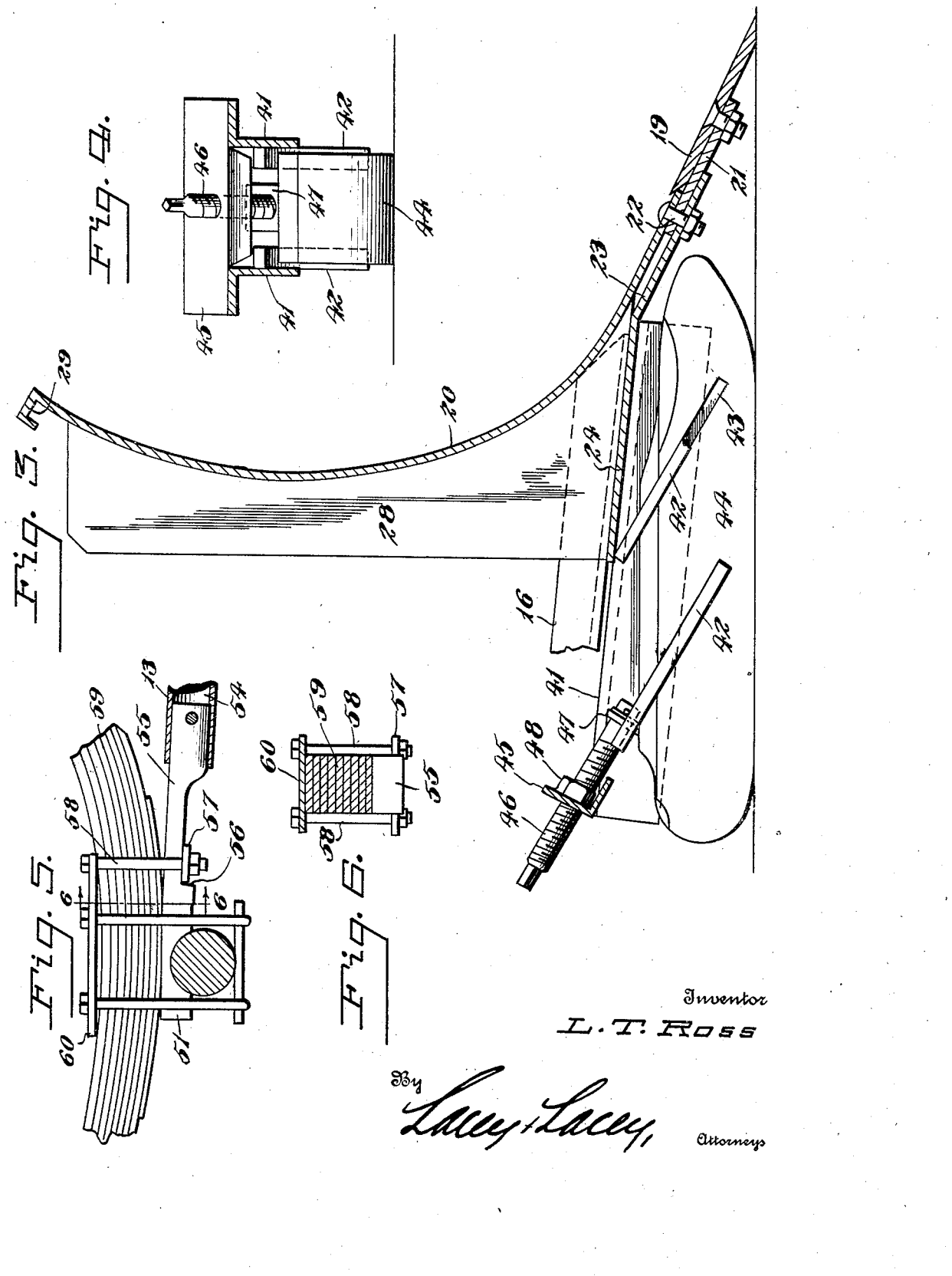

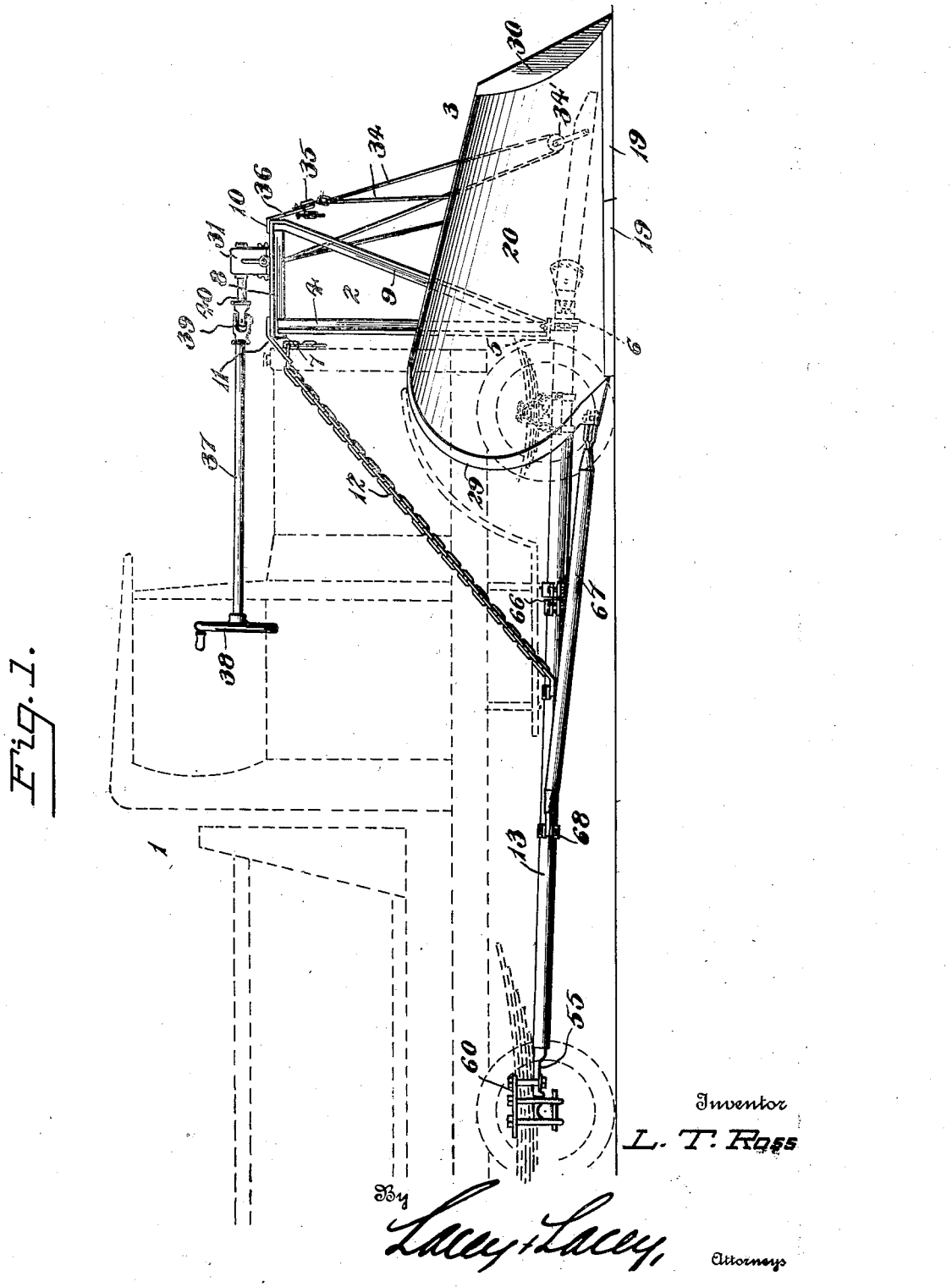

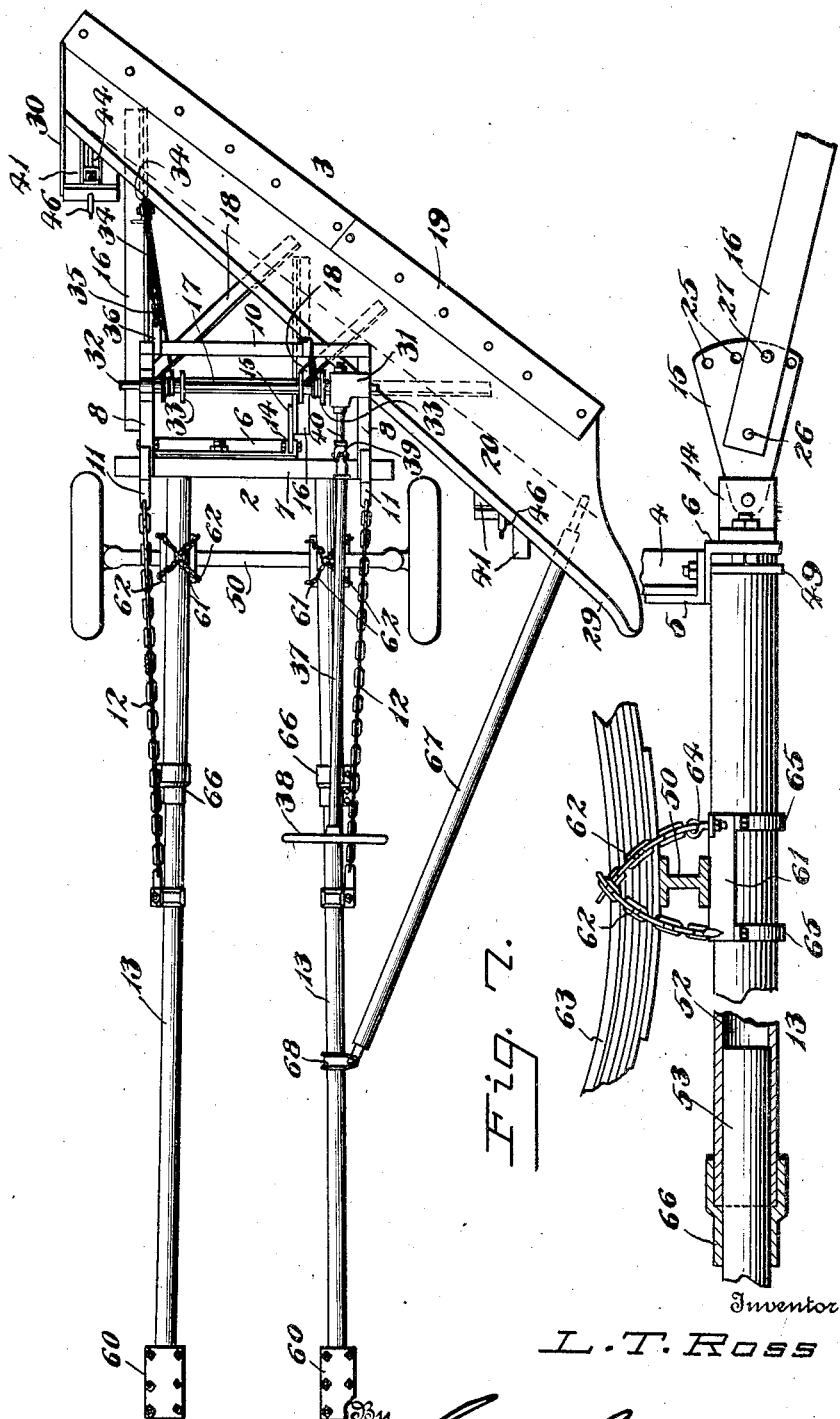

Patented Oct. 17, 1933

1,930,862

UNITED STATES PATENT OFFICE 1,930,862

SNOWPLOW

Lester T. Ross, Crestline, Ohio, assignor to The Burch Corporation, Crestline, Ohio, a corporation of Ohio Application March 2, 1931. Serial No. 519,579

10 Claims. (Cl. 37—42)

This invention has for its object the provision of a snow plow which will be strong, efficient and durable but which will be devoid of excessive weight and may be mounted upon the front of a tractor or motor truck and easily driven through snow to clear a road and deposit the removed snow at one side of the path. One embodiment of the invention is illustrated in the accompanying drawings, and the invention resides in certain novel features which will be hereinafter first fully described and then more particularly pointed out in the appended claims.

In the drawings:

Figure 1 is a side elevation of a snow plow embodying the invention, a portion of a motor truck being indicated by dotted lines, Fig. 2 is a top plan view of the same, the motor truck being removed but the front axle and wheels of the same being shown in order to illustrate the manner of connecting the plow therewith, Fig. 3 is an enlarged vertical section through the plow adjacent one of the supporting shoes, Fig. 4 is a detail rear sectional elevation of one of the shoes, Fig. 5 is a detail showing the manner of connecting the push bar with the rear axle of the truck, Fig. 6 is a detail section on the line 6—6 of Fig. 5, and Fig. 7 is a detail sectional elevation of one of the push bars and its connection with the front axle and spring of the vehicle.

The motor truck or tractor, indicated at 1, may be of any known or approved type. In carrying out the present invention, there is provided a frame 2 which is to be mounted at the front of the truck and from which the plow, indicated as an entirety by the reference numeral 3, is carried. This supporting frame 2 includes standards 4 which are connected at their lower ends by a cross bar 5 and carry an abutment bar 6 which is secured to the under side of the cross bar 5. At the upper ends of the standards 4 there is provided a cross bar 7, and secured to said cross bar adjacent the ends of the same are forwardly projecting overhanging beams 8 from the front ends of which braces 9 extend downwardly and rearwardly to the cross bar 5 to which they are secured. The front ends of the beams 8 are connected by a cross beam and brace 10 whereby a strong, rigid supporting frame is produced. At the rear of the frame, hooks or brackets 11 are provided at the upper end of the same, and to these hooks or brackets are attached the upper ends of guy chains 12 which extend downwardly and rearwardly and have their opposite ends securely attached to the respective push bars 13 whereby the frame is effectually braced and held against toppling forward while, at the same time, they aid in supporting the push bars, as will hereinafter appear. The abutment bar 6 is preferably formed of angle iron and is provided on its front side with forks or spaced lugs 14 to and between which are pivotally attached plates 15 of substantially triangular form, with their upper and lower edges diverging forwardly. To each of these plates 15 is pivotally secured the rear end of a supporting arm 16 which is preferably of angle iron and the front end of which is connected to the plow 3. The arms 16 have also secured thereto a cross brace 17 which extends laterally beyond the right side of the main supporting frame 2 and has its extended end secured to the plow. There are also additional obliquely disposed braces 18 secured to the arms 16 which project obliquely forward and are likewise connected to the plow. The plow comprises a blade or share 19, which may be a single element extending the full width of the plow or a plurality of similar elements, two being illustrated in the present drawings. As shown clearly in Fig. 3, the blade is beveled on both its side edges whereby either edge may be utilized as a cutting edge, the blade being thus rendered reversible so that when one edge has become worn, the opposite edge may be brought into use without loss of time required to sharpen the share. The plow also comprises a moldboard 20 which extends upwardly and rearwardly from the blade or share and has a concave front face whereby the snow raised by the blade will be rolled over instead of being pushed ahead as a dead weight. The moldboard is also set obliquely, as clearly shown in Fig. 2, and projects laterally beyond one side of the propelling truck or tractor so that a wide path will be formed and the snow will be deposited at one side beyond the path in such a manner that it will not roll back onto the cleared space. The blade or share is secured upon the front marginal portion of a connecting plate 21, the rear edge of which projects under the front edge of the moldboard and is firmly bolted thereto, as shown clearly in Fig. 3. Secured to the moldboard and the connecting plate 21, by the same bolts 22 which join the connecting plate and the moldboard, is a push plate 23, the front edge portion of which projects under the connecting plate and the rear portion of which extends rearwardly at an angle to the front portion, as shown at 24, and is secured to the under sides of the several supporting arms and braces 16, 17 and 18 whereby the moldboard will be very firmly supported and carried by the frame 2. The pivotal connection of the plates 15 to the abutment bar 6 will accommodate irregularities in the road so that if the truck should happen to drop into a cross rut, the plow may maintain its normal position on the road to cut through and clear away the snow, and the pivotal adjustable connection of the arms 16 with the plates 15 permits the plow to be set at any desired angle to the horizontal so that its cutting edge will properly engage and penetrate the snow without digging into the ground. Upon reference to Fig. 7, it will be noted that the connecting plate 15 is provided adjacent its forward edge with a plurality of openings 25 arranged in a series concentric with the pivot 26 connecting the arm 16 with the plate, and said arm carries a bolt or locking pin 27 which is engageable in any one of the openings 25 whereby the arm will be held in a set position. The moldboard is reinforced by sheet metal braces 28 set on edge vertically across the back of the moldboard and conforming thereto, as clearly shown in Fig. 3. The lower portions of the braces 28 bear against the sides of the arms 16 and rest upon the rear portion of the push plate 24 and are welded to the same and to the moldboard so that a very rigid structure is produced, free of excessive weight, and buckling of the moldboard is overcome so that it will very effectually perform its function of turning the snow to one side. To further resist buckling of the moldboard, its upper edge is preferably formed into a rearwardly extending re-entrant flange 29 which will stiffen the upper portion of the moldboard in an obvious manner. At the left or forward end of the moldboard there is a landside 30 which projects forwardly beyond the face of the moldboard so that it will cut through the snow and thereby lessen the strain on the forward end of the plow.

Mounted upon the top of the frame 2 and resting on a beam 8 is a gear case 31, a winding shaft 32 being mounted at one end in said case and at its opposite end in a suitable bearing upon the other beam 8, as will be understood upon reference to Fig. 2. This shaft 32 has spools 33 secured thereon, and cables 34 are secured to the respective spools to wind thereon, said cables passing downwardly from the spools to guide pulleys 34' mounted upon the respective arms 16 adjacent the moldboard and then extending up to short chains 35 attached to brackets 36 on the front of the frame 2 at the top of the same. A controlling shaft 37 is provided and extends into the cab of the vehicle where it is equipped with a handwheel 38 whereby it may be rotated when necessary. The front end of this controlling shaft or rod 37 is connected by a universal joint 39 with the rear end of a short shaft 40 which extends into the gear case and is operatively connected with the winding shaft 32 through suitable gearing housed in the gear case, as will be understood.

At the rear of the moldboard, at or adjacent the respective ends thereof, are runner frames 41 which are secured in any convenient manner to the adjacent arm 16 or to the brace 17 or to the push plate 24, as may be most convenient. These runner frames 41 comprise parallel members, as shown in Fig. 4, provided on their inner opposed sides with downwardly and forwardly extending lugs 42 engaging in grooves 43 in the opposite sides of a runner or shoe 44. The rear end of each frame 41 is bridged by an angle bar 45, threaded through which is an adjusting screw 46 having its front end swiveled in a lug or bracket 47 rising from the adjacent shoe 44 near the rear end of the same. The screw is held in a set position by a lock nut 48 mounted thereon and adapted to be turned home against the bar 45, as will be understood upon reference to Fig. 3. It will be noted that the front ends of the shoes are tapered so that inclined surfaces are provided on both their upper and their lower sides, this formation not only facilitating the travel of the shoes over the snow and ground but also permitting them to be adjusted close to the plow for firmly supporting the same.

The push bars 13 have their front ends secured firmly to the base bar 5 and the abutment bar 6 in any convenient manner, which will possess the necessary strength, a clip 49 being illustrated in Fig. 7. The push bars extend rearwardly below the front axle 50, and their rear ends are arranged to abut the spring pads 51 which rest upon the rear axle under the rear springs, as will be understood upon reference to Fig. 5, these pads being secured in place by the clip bolts which secure the springs upon the axle. The push bars are of telescopic formation whereby they may be adjusted to the wheel base of the particular truck or tractor to which the plow is to be applied, the front member of the push bar being tubular, as shown at 52 in Fig. 7, while the rear member is a solid rod 53 having its rear end formed with a socket 54 in which is secured a block 55 extending rearwardly to bear against the spring pad 51, as clearly shown in Fig. 5, the rear extremity of the block 55 being formed with a depending lug or shoulder 56 against which may be disposed a retaining clip plate 57 through the ends of which bolts 58 are extended upwardly at the sides of the spring 59 and pass through the front end of an upper clip plate 60 which is longer than the clip plate generally employed and is substituted therefor in order to provide the required support for the rear end of the push bar. The forward portion of the push bar is equipped with a plate 61 resting thereon and adapted to bear against the under side of the front axle 50, this plate 61 having attached thereto at its rear corners chains 62 which pass upwardly and are crossed over the front springs, indicated at 63, and then carried downwardly to be engaged in hooks or similar elements 64 at the front corners of the plates. The chains can be adjusted so as to obtain the necessary firm support for the push bars, and the plates 61 are held on the push bars by clamps 65 encircling the push bars, as will be understood upon reference to Fig. 7. To maintain the members of the push bars in their set relation after they have been adjusted, clamps 66 are provided which encircle the rear ends of the forward members of the respective push bars and the immediately adjacent portion of the rear portions of the bars. The supports 61, 65 permit the push bars to slide freely thereby providing longitudinal freedom for the front axle to accommodate the compression of the springs under the weight of the truck and its load.

A diagonal brace 67 extends between the outer or rear end of the plow and the right-hand push bar, its front end being pivotally connected in any convenient manner to the push plate 24, and the rear end being pivoted in a clamp 68 which is firmly secured upon the adjacent push bar. This brace 67 serves to withstand the thrust upon the free end of the moldboard and also cooperates with the braces 18 to resist side draft of the plow which spreads equally through the entire length of the truck.

From the foregoing description, taken in connection with the accompanying drawings, it will be seen that I have provided a very simple and light plow which is effective, strong and durable. The particular formation of the moldboard and the mounting of the same very effectually resist the thrust thereon, and the shape and disposition of the moldboard cause the raised snow to be rolled over to one side as the plow is driven over the road so that the snow is all deposited clear of the path. The stress of the plow is transmitted through the push bars to the spring pads on the rear axle of the truck and, consequently, the power of the truck is very efficiently employed to drive the plow through the snow. The plow may be very easily and quickly applied to any truck and just as easily and quickly removed from the truck when its use is no longer desired. When the plow is to be used, it can be lowered by properly rotating the controlling rod or shaft 37 and thereby giving the proper movement to the winding shaft 32, as will be understood, the plow being raised above the ground while it is being transported to a point of use or being returned to storage after use. It will be noted that the plow is off center relative to alinement with the truck so that it is balanced when encountering heavy drifts and side sway of the truck is avoided.

Having thus described the invention, I claim:

1. A snow plow comprising a moldboard, a connecting plate bearing against the under side of the mold board along the front edge thereof, a blade resting on and detachably secured to the connecting plate, a push plate extending rearwardly from the moldboard, and fastening devices extending through the moldboard, connecting plate and push plate.

2. A snow plow comprising a moldboard, a landside at one end of the moldboard and projecting beyond the front face thereof, a connecting plate bearing against the under side of the mold board along the front edge of said mold board, a reversible blade detachably secured to the connecting plate, a push plate extending rearwardly from the moldboard and having its forward portion inclined downwardly, and fastening devices extending through the moldboard, connecting plate and inclined portion of said push plate.

3. A snow plow comprising a moldboard, a blade arranged in advance of the lower edge of the moldboard, a connecting plate secured to the underside of the moldboard and the underside of the blade, a push plate disposed at the rear of the moldboard and secured to and under the lower edge portion of the same and under the connecting plate, means for connecting the push plate with the moldboard, and means for applying power to the push plate to drive the plow forward.

4. The combination with a snow plow, of a supporting frame, means for mounting the frame upon a vehicle, connecting plates pivoted to said frame, and plow supporting arms pivotally attached to said connecting plates and having means for attachment to said plates in a set relation thereto.

5. In a snow plow, the combination of telescopic push bars, means whereby the snow plow will be supported at the front ends of said push bars, supports on the push bars including plates adapted to bear against the under side of the axle of a vehicle and provided with retaining elements, and chains attached to the supports and adapted to pass upwardly over the springs of a vehicle and engage the retaining elements on the plates whereby to suspend the push bars from the axle and springs of the vehicle.

6. In a snow plow, push bars provided at their rear ends with blocks adapted to bear against the rear spring mounts of a vehicle, means for suspending said blocks from the vehicle springs, means for suspending the push bars from the front spring mounts of the vehicle, and means at the front ends of the push bars for supporting a snow plow.

7. In combination, a vehicle embodying traction means, a supporting frame secured to the front of the vehicle and including downwardly converging side members, an abutment bar connecting the side members at the converging ends thereof, a snow plow pivotally mounted on said frame, push bars having their front portions bearing against the abutment bar and their rear portions provided with means for connection with an axle of the vehicle, and means mounted on the supporting frame and operatively connected with the plow for raising and lowering the latter.

8. In combination, a vehicle embodying traction means, a supporting frame secured to the front of the vehicle and substantially V-shaped in side elevation, an abutment bar secured to the frame at the lower end thereof, a snow plow pivotally mounted on said frame, push bars having their front portions bearing against the abutment bar and their rear portions provided with means for connection with an axle of the vehicle, flexible connections between the supporting frame and push bars, and means mounted on the upper end of the supporting frame and operatively connected with the plow for raising and lowering the latter.

9. In combination, a vehicle embodying traction means, a supporting frame secured to the front of the vehicle and including downwardly converging side members, a transverse abutment bar connecting said side members at their points of convergence, a snow plow pivotally mounted on said frame, push bars having their front portions secured to the abutment bar and their rear portions provided with means for connection with an axle of the vehicle, flexible connections between the supporting frame and intermediate portions of the push bars, a brace forming a connection between the snow plow and one of the push bars, and means mounted on the supporting frame and operatively connected with the snow plow for raising and lowering the latter.

10. In combination, a vehicle including traction means, a downwardly tapered supporting frame secured to the front of the vehicle, an abutment bar disposed at the lower end of the frame and forming a part thereof, a snow plow pivotally mounted on said frame, telescopic push bars having their front portions connected with the abutment bar and their rear portions provided with means for attachment to an axle of the vehicle, flexible connections between the supporting frame and said push bars, a winding shaft mounted on top of the frame, means operable from the vehicle for rotating said shaft, cables connected to the shaft to wind thereon and having fixed connection with the frame, and guide pulleys on the plow about which intermediate portions of the cables are trained.

LESTER T. ROSS. [L. S.]